C. A. BOWRON.
COLLAPSIBLE SHOE TREE.
APPLICATION FILED JULY 15, 1911.
1,012,978.
Patented Dec. 26, 1911.
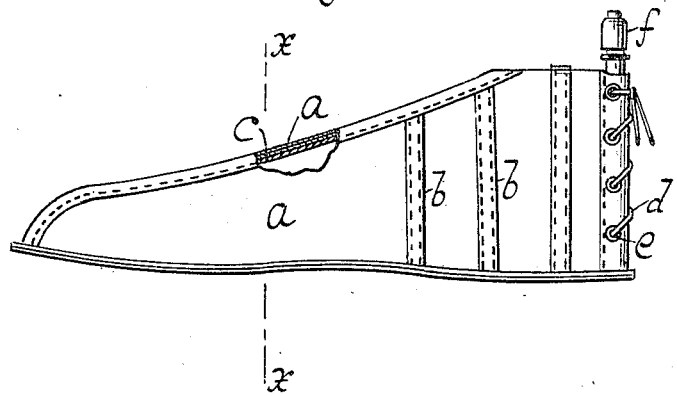
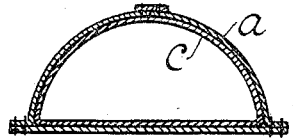
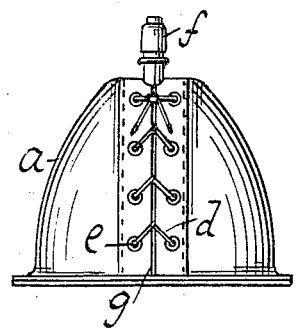
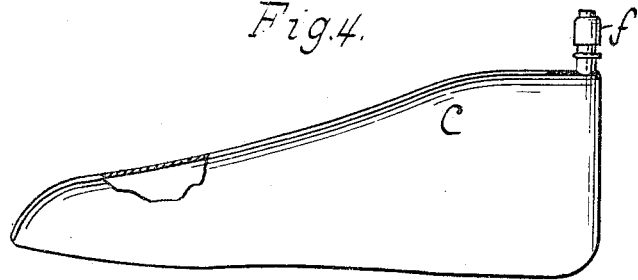
Witnesses:
William Miller
Chris. H. Almstaedt
Inventor
Clara A. Bowron
By her Attorneys
Havf & Harland

UNITED STATES PATENT OFFICE.

CLARA A. BOWRON, OF NEW YORK, N. Y.

COLLAPSIBLE SHOE-TREE.

1,012,978.   Specification of Letters Patent.   Patented Dec. 26, 1911.

Application filed July 15, 1911. Serial No. 638,633.

*To all whom it may concern:*

Be it known that I, CLARA A. BOWRON, a citizen of the United States, residing at New York, in the county of New York and State of New York, have invented new and useful Improvements in Collapsible Shoe-Trees, of which the following is a specification.

My invention consists of a new and improved form of collapsible shoe tree.

The tree is made of canvas or any heavy non-stretchable cloth or it may be made of soft leather or kid. The tree has an inner form made of thin sheet rubber of the same shape as the tree, but not necessarily the same size. This inner rubber form has at its upper end a valve tube with a valve attached. The valve extends through the canvas shoe tree, which is laced where the inner rubber tree is inserted. This inner rubber form is inflated with air so as to expand the canvas shoe tree and make it as hard and solid as wood, but of course the tree when constructed according to my invention does not weigh as much as wood and by being collapsible can be readily packed in a traveling bag or trunk.

The canvas or cloth shoe tree is made the size and shape of the shoe in which it is to be used. The rubber inner form need only be made in a few sizes, as the air stretches it to any desired size of the canvas shoe tree. The tree is inserted in the shoe in collapsed form and then inflated with a small hand bulb (not shown). The shoe tree can be made to fit any size or any shape of shoe or slipper or boot high or low. The canvas or non-stretchable material of which the shoe tree is made is strapped or reinforced in order to give it strength and rigidity and the seams may also be strapped to enable the tree to better resist the air pressure.

I am aware that collapsible shoe trees have been made heretofore, but they have all been made of rubber or elastic material and they have never been practicable for the reason that the rubber having nothing to restrain it, will expand most in the parts where there is the least pressure, and it is impossible to get a proper amount of pressure where it is most required. By my invention the entire tree is made of cloth or non-expansible material and completely covers the rubber form, so that when the air is inserted the pressure is uniform throughout the entire tree.

In the accompanying drawings; Figure 1 represents a side elevation of my tree fully distended for use. Fig. 2 is a cross sectional view taken on the line $x\ x$ Fig. 1. Fig. 3 is a rear elevation of Fig. 1 showing the lacing. Fig. 4 is a view of the inner rubber form partly broken away.

The device consists essentially of a tree made of canvas or non-stretchable material or leather and is designated by the letter $a$. Straps or bands $b$ are placed at intervals to lend rigidity to the tree and hold it in shape. The inner collapsible pneumatic form or member $c$ is placed inside the tree $a$ through an opening $g$ and then the opening in the canvas tree is laced up by laces $d$ passed through holes $e$ as shown more distinctly in Fig. 3. A valve $f$ is attached to the rear upper end of the member $c$. The tree is then inserted in the shoe and air pumped in through the valve $f$ by an ordinary small rubber hand pump which is not shown here. The pressure of the air into the member $c$ of course inflates it and thus in turn inflates the outer member $a$ so that a tree is produced which is hard and rigid and fills out the shoe and keeps it in shape as well as a wooden tree would, but it is of course much lighter than wood. I do not confine myself to the exact method for lacing the opening, it being within the scope of the invention that other means of fastening could be used.

I claim:

1. A collapsible shoe tree comprising an outer cover of canvas, a pneumatic rubber form arranged in the cover, said cover being provided with a slit adapted for the insertion of the form, devices for closing the slit, a valve tube connected to the form and projecting through the upper portion of the slit.

2. A collapsible shoe tree comprising an outer cover of canvas with reinforcing strips extending about the sides of the cover, a pneumatic rubber form arranged in the cover, said cover being provided with a slit adapted for the insertion of the form, devices for closing the slit, a valve tube connected to the form and projecting through the upper portion of the slit.

In testimony whereof I have hereunto set my hand in the presence of two subscribing witnesses.

CLARA A. BOWRON.

Witnesses:
WM. E. WORLAND,
H. V. MCELROY.